Patented May 6, 1952

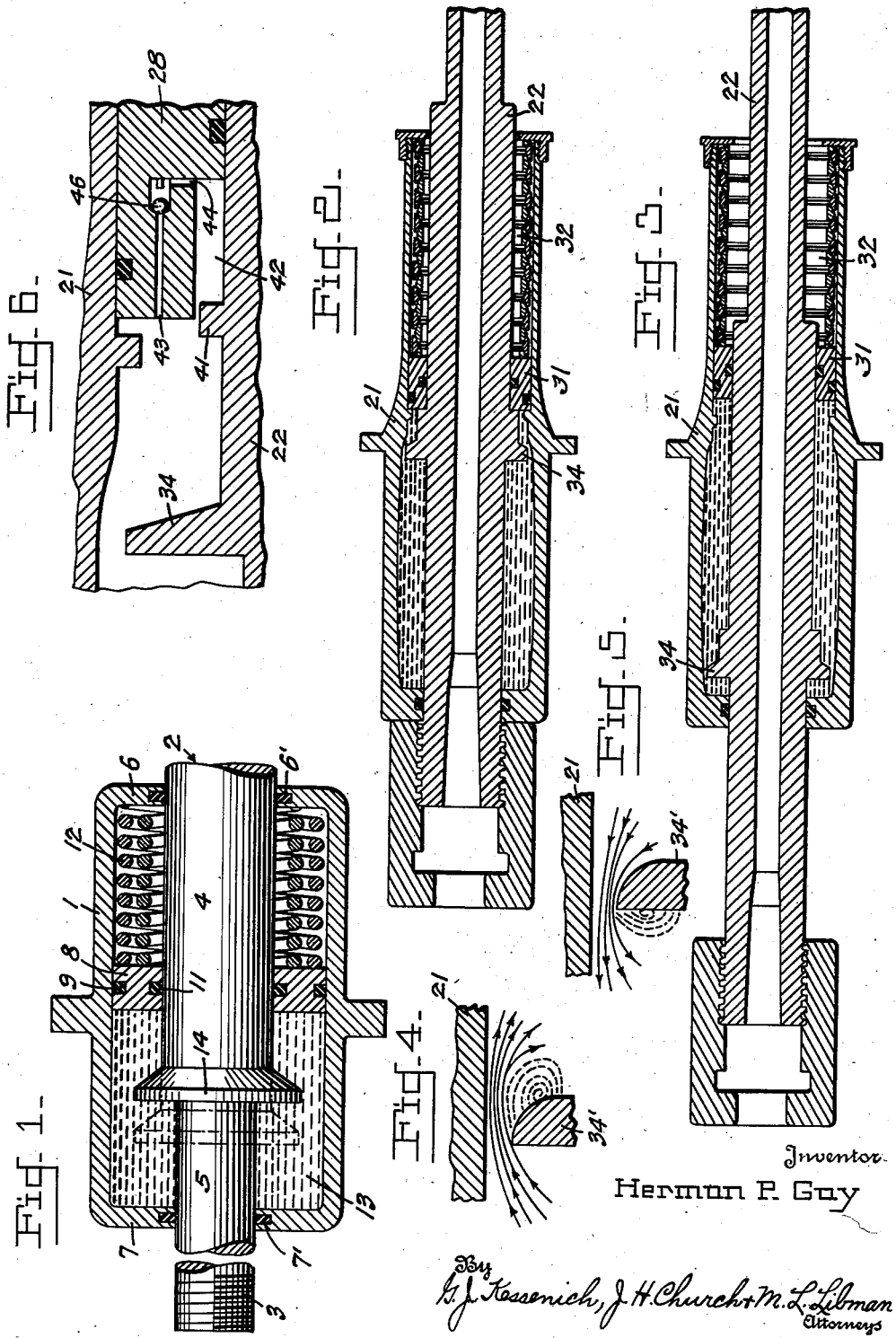

2,595,239

UNITED STATES PATENT OFFICE 2,595,239

HYDROSPRING SHOCK ABSORBER

Herman P. Gay, Havre de Grace, Md., assignor to the United States of America as represented by the Secretary of the Army Application June 30, 1948, Serial No. 36,052

7 Claims. (Cl. 267—64)

(Granted under the act of March 3, 1883, as amended April 30, 1928; 370 O. G. 757)

The invention described herein may be manufactured and used by or for the Government for governmental purposes without the payment of any royalty thereon.

My invention relates to shock absorbers for yieldingly connecting two parts of a mechanism subjected to large-amplitude shocks, and is suitable for use with recoil mechanism for guns, shock absorbers for airplane landing gear, etc.

The primary object of the invention is the provision of a shock absorber using a spring as an energy-storing device, together with hydraulic means for reducing the dynamic stress on the spring when the initial shock is of very high velocity, as occurs for example in a gun recoil mechanism. Other objects are to reduce the weight and size of the absorber for a given capacity, compared to former designs; to enable the use of a friction ring spring of short stroke to absorb shocks of large amplitude, and to provide a shock or recoil-absorbing action similar to that heretofore obtained only with hydro-pneumatic systems, but with a much simpler and less complicated construction.

Further objects and advantages of my invention will now fully appear in the following description of the preferred embodiments of my invention, in which:

Figure 1 is a longitudinal cross-sectional schematic view of a shock absorber showing the principles of my invention, Figure 2 is a longitudinal cross-sectional schematic view showing the shock absorber of my invention applied to a gun as a recoil mechanism, the gun being in the battery position, Figure 3 shows the device of Figure 2 but with the gun in the maximum recoil position, Figures 4 and 5 are schematic views of the asymmetrical "floating orifice" part of my device, showing the different operation in different directions, Figure 6 is a sectional view of a counterrecoil buffing means which may optionally be incorporated into my invention.

Referring to Figure 1 the cylinder 1 is fastened in any convenient manner to one of the relatively movable member whose relative motion is to be cushioned, and the plunger 2 is fastened in any convenient manner to the other of said movable members, as by threaded rod 3. Plunger 2 comprises two coaxial cylinders 5 and 4, of different diameters as shown, each slidable in an opposite end wall 6 and 7 of cylinder 1, through a suitable fluid-tight packing schematically indicated at 6' and 7'. A floating piston 8 slidably engages the inner wall of cylinder 1 and the outer wall of cylinder 4 in fluid-tight fashion, schematically represented by packing rings 9 and 11. Floating piston 8 bears against the free end of spring 12, the other end of which bears against the end wall 6 of cylinder 1. All of the remaining space in the cylinder 1 on the other side of floating piston 8 from spring 12 is filled with a suitable substantially incompressible fluid 13. It will be apparent that as the plunger moves to the left in Figure 1, the cross-sectional area entering the cylinder is greater than the cross-sectional area leaving the cylinder. This condition tends to decrease the volume in the cylinder, but the oil is practically incompressible, so that the floating piston 8 is forced against spring 12, compressing same. The ratio of movement of plunger 2 to piston 8 is of course proportional to the ratio of the effective areas of the plunger and piston, respectively. In practice this ratio will be designed so that a large movement of the plunger produces relatively small movement of the floating piston. This of course means that the velocity of motion is also correspondingly reduced. In the case of extremely high velocity shocks, such as would occur if the device is used as the recoil mechanism for a gun, this reduction in velocity is important because the high velocity shock impulse on the mounting end of the spring, in conventional spring recoil mechanisms, has been found to cause a high rate of spring failures. With my device, the action is also still further slowed down by the throttling effect of the reduced flow area provided by the flange 14 on plunger piston 2. This flange provides, in effect, an orifice of reduced cross-section area to retard the fluid flow between the left end of the cylinder and the right end as the plunger piston moves back and forth. The flange thus provides a "floating throttle" for the fluid flow.

With the spring 12 compressed as above described, when the compressing force is removed from plunger 2, the spring 12, pressing on floating piston 8, transmits a force to the exposed area cylinder walls, which acts on the end of plunger piston 2 to force the plunger back into its initial position. The piston orifices in end walls 6 and 7 are provided with suitable fluid-tight packing schematically indicated at 6', 7', and floating piston 8 is similarly provided with packing 9, 11, to insure a fluid-tight fit.

Figure 2 shows my invention applied, by way of specific example, to a gun, such, for example as a light weight aircraft gun. The breech end of the barrel 22 serves as the plunger piston in this case, and is surrounded by recoil cylinder 21, within which it may slide between the limits shown in Figure 2 and 3, respectively, the latter representing full recoil position. In this case, a friction ring spring 32 is shown instead of double coil spring 12 of Figure 1, but otherwise all of the elements correspond to those shown in Figure 1, and the operation is exactly the same. As the gun is fired, the recoil forces the barrel backwards into the position shown in Figure 3, the floating piston 31 moving the short distance shown. This compresses the friction ring spring 32, which thereupon restores the gun to its original battery position shown in Figure 2.

If the flange 34 has a symmetrical cross-section at its edge, the floating throttle, considered as an orifice, will offer the same resistance to flow in either direction, but if this cross-section is not symmetrical, as shown in Figures 4 and 5, at 34' (corresponding to flange 34 in Figure 2), the resistance to flow will be greater in one direction than in the other, due to the difference in turbulence of the flow past the sharp edge and past the rounded edge, as is well understood in the art. Thus the piston characteristic can be still further altered to speed up or slow down the return stroke relative to the initial stroke.

In many cases it is desirable to bring the gun to rest smoothly at the battery position instead of allowing it to stop relatively suddenly. This can be provided by the means shown in Figure 6. In this figure an additional smaller flange 41 is provided behind flange 34 providing in effect a buffer piston which cooperates with an annular recess 42 in floating piston 28'. Thus a buffer chamber is formed by flange 41 and recess 42 when the parts are in the position shown in Figure 6. When the gun barrel is moving back into battery position from the position of Figure 6 the buffer piston 41 cooperates with the recess 42 to provide an additional buffing action. One or more bores 43, 44 are provided between recess 42 and the main cylinder area, with a one-way valve 46 between the two bores serving to permit passage of fluid in the bore only from the cylinder chamber into the buffer chamber, but not vice versa. This, at the start of recoil the movement of the gun barrel is not unusually impeded, but at the end of the return stroke a buffing action is provided.

Although I have shown my invention applied to a gun it will be obvious that it is equally applicable to other shock absorbing utilization, and the invention is not limited to the specific embodiments shown, but its scope is defined by the appended claims.

I claim:

1. A shock absorber for yieldingly connecting two elements of a mechanism subjected to shocks, comprising a cylinder fastened to one of said elements, a plunger extending through said cylinder and fastened to the other one of said elements, said plunger consisting of two portions of different diametric dimensions, a floating piston slidably mounted over said plunger within said cylinder dividing said cylinder into two parts, a spring subject to deformation upon relative movement of said two elements mounted in one of said parts of said cylinder, said spring operatively engaging said floating piston and one end of said cylinder, said other part being completely filled with a substantially incompressible fluid under pressure acting on said floating piston, whereby said floating piston is held at all times in equilibrium by said fluid pressure and said spring pressure, an annular throttling flange of substantially larger cross sectional area than said plunger mounted thereon at the jointure between the two portions thereof, and coaxial sealing means to confine said fluid to said other part, the portion of larger diametric dimensions of said plunger being moved into said other part of the cylinder upon occurrence of a shock whereby the increase in pressure caused by the increase of volumetric displacement by said plunger is absorbed by said floating piston and spring to maintain equilibrium therebetween.

2. A shock absorber for yieldingly connecting two separate elements for limited movement therebetween during shocks, comprising a cylinder including two end walls provided with openings therein, a plunger consisting of two cylindrical tubes of different diameter having an annular throttling flange of substantially larger diameter than said tube at the jointure thereof, said plunger extending across said cylinder through said openings, a floating piston slidably mounted over said plunger within said cylinder and dividing the inside thereof into two parts, a spring housed in one part of said cylinder and operatively engaging said floating piston and one of said end walls, a substantially incompressible fluid under pressure in the other part of said cylinder acting on said floating piston whereby said floating piston is held at all times in equilibrium between said fluid pressure and said spring pressure, said flange being at all times in said other part of the cylinder, and coaxial sealing means located in said openings and in said floating piston for confining said fluid to said other part, said plunger moving in a direction tending to increase the volumetric displacement thereof within said cylinder in response to shocks, whereby said shocks are absorbed by said floating piston and said spring.

3. The apparatus according to claim 2 wherein said spring is of the double coil type.

4. The apparatus according to claim 2 wherein said spring is of the friction ring type.

5. A shock absorber for connecting two separate elements for limited movement therebetween during occurrence of shocks, comprising a cylinder having end walls provided with openings therein, a plunger consisting of two cylindrical tubes of different diameter having an annular throttling flange of substantially larger diameter than said tubes at the jointure thereof, said plunger extending across said cylinder through said openings, a floating piston slidably mounted over said plunger within said cylinder and dividing the inside thereof into two parts, a spring housed in one of said parts of said cylinder and operatively engaging said floating piston and one of said end walls, a substantially incompressible fluid under pressure in the other part of said cylinder acting on said floating piston whereby said floating piston is held at all times in equilibrium between said fluid pressure and said spring pressure, said plunger being positioned in said cylinder with said flange at all times in said other part of the cylinder, said flange having asymmetric, external dimensions offering greater hydrodynamical resistance during movement of said plunger in the direction of volumetric increase thereof in said other part.

6. The apparatus according to claim 5 further comprising means for smoothly restoring said plunger to its position of original equilibrium after cessation of said shock.

7. The apparatus according to claim 6, wherein said last-mentioned means comprises a further flange mounted on said plunger and a recess in said floating piston receiving said further flange, said recess being connected to said other part by a unidirectional valve means.

HERMAN P. GAY.

REFERENCES CITED

The following references are of record in the file of this patent:

UNITED STATES PATENTS

| Number | Name | Date |
|---|---|---|
| 254,917 | Canet | Mar. 14, 1882 |
| 1,261,011 | Cook | Apr. 2, 1918 |
| 1,397,377 | Harpham | Nov. 15, 1921 |
| 2,248,865 | Griepenstroh | July 8, 1941 |
| 2,342,381 | Thornhill | Feb. 22, 1944 |
| 2,346,667 | Dowty | Apr. 18, 1944 |
| 2,460,116 | Bazley | Jan. 25, 1949 |